(12) United States Patent
Hoeptner, III

(10) Patent No.: US 12,577,762 B2
(45) Date of Patent: Mar. 17, 2026

(54) FREEZE RESISTANT WALL HYDRANT

(71) Applicant: Herbert W. Hoeptner, III, Gilroy, CA (US)

(72) Inventor: Herbert W. Hoeptner, III, Gilroy, CA (US)

( * ) Notice: Subject to any disclaimer, the term of this patent is extended or adjusted under 35 U.S.C. 154(b) by 0 days.

(21) Appl. No.: 18/752,581

(22) Filed: Jun. 24, 2024

(65) Prior Publication Data

US 2024/0426087 A1 Dec. 26, 2024

Related U.S. Application Data

(60) Provisional application No. 63/523,361, filed on Jun. 26, 2023.

(51) Int. Cl.
| | |
|---|---|
| *E03B 9/02* | (2006.01) |
| *E03B 7/12* | (2006.01) |
| *E03B 9/14* | (2006.01) |
| *F16K 27/00* | (2006.01) |

(52) U.S. Cl.
CPC ............... *E03B 9/027* (2013.01); *E03B 7/12* (2013.01); *E03B 9/14* (2013.01); *F16K 27/006* (2013.01)

(58) Field of Classification Search
CPC .......... F16K 27/006; F16K 31/46; E03B 9/02; E03B 9/025; E03B 9/027
See application file for complete search history.

(56) References Cited

U.S. PATENT DOCUMENTS

| | | | | |
|---|---|---|---|---|
| 4,473,244 A * | 9/1984 | Hill | ........................... | E03B 7/12 |
| | | | | 285/46 |
| 6,830,063 B1 * | 12/2004 | Ball | .......................... | E03B 7/10 |
| | | | | 137/59 |
| 7,992,585 B2 * | 8/2011 | Fitzpatrick | .............. | F16K 3/085 |
| | | | | 137/271 |
| 9,016,306 B1 * | 4/2015 | Cantrell | ................... | F16L 5/00 |
| | | | | 137/301 |
| 9,145,663 B1 * | 9/2015 | Hoeptner | .................. | E03B 9/04 |
| 10,822,775 B1 * | 11/2020 | Wiggins | ................. | E03B 9/027 |

* cited by examiner

*Primary Examiner* — Kevin F Murphy
(74) *Attorney, Agent, or Firm* — Intellectual Innovations Legal Advisors

(57) ABSTRACT

A freeze resistant wall hydrant including an outdoor housing joined to the outer end of an outlet tube for securing to a building and a fitting joined to the inner end of the outlet tube for coupling to a water supply. The fitting includes a fluid closure valve having a valve part movable between first and second positions for closing and opening the valve. A stem extends through the outlet tube and has an outer end coupled to a handle of the outdoor housing and an inner end coupled to the valve part. The handle moves the valve part to close and open the valve. The outlet tube and the stem can each be made from a cross-linked polyethylene or flexible plastic to facilitate installation of the wall hydrant. Methods for using or resizing the wall hydrant are provided.

14 Claims, 5 Drawing Sheets

FREEZE RESISTANT WALL HYDRANT

CROSS REFERENCE TO RELATED APPLICATION

This application claims priority to U.S. provisional patent application Ser. No. 63/523,361 filed Jun. 26, 2023, the entire content of which is incorporated herein by this reference.

FIELD OF THE INVENTION

This invention relates generally to wall hydrants, and more particularly to wall hydrants that are resistant to freezing.

BACKGROUND OF THE INVENTION

Water hydrants for placement in walls of a building structure have been provided. Some current hydrants have features that resist freezing of water in the hydrant due to freezing temperatures external of the building structure. See for example U.S. Pat. Nos. 6,142,172, 6,830,063, 8,739,810 and 9,145,663.

Improvements are needed in wall hydrants to facilitate the installation of hydrants in building structures.

DETAILED DESCRIPTION OF THE INVENTION

Figures 1, 2:
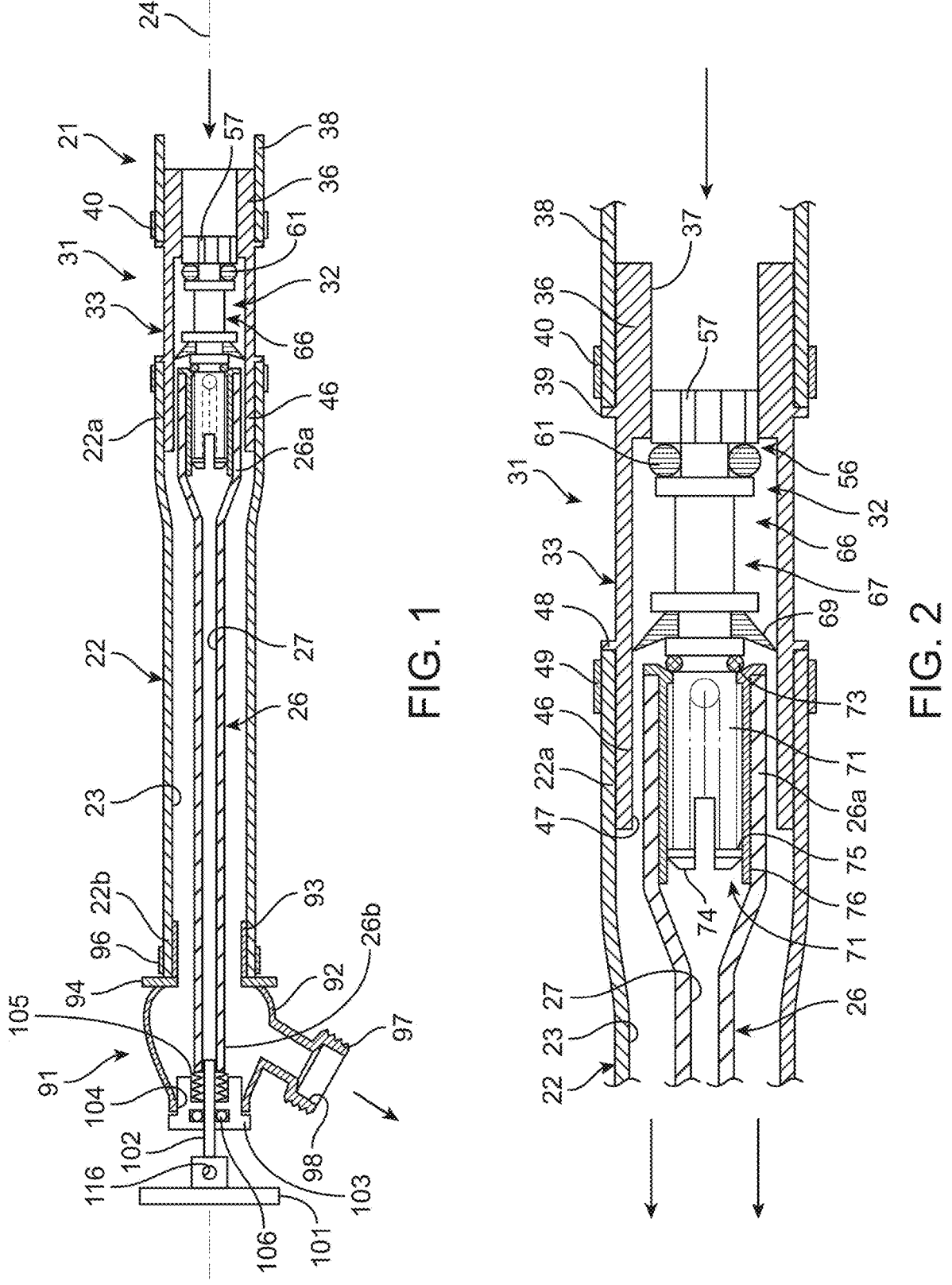
FIG. 1 is a schematic cross-sectional view of a freeze resistant wall hydrant of the invention in a first or open configuration.
FIG. 2 is an enlarged cross-sectional view of a portion of the inner end of the freeze resistant wall hydrant of FIG. 1 in the first or open configuration.

A wall hydrant is provided that can optionally be installed in an external wall of a building structure, for example in areas where the external atmosphere can experience freezing temperatures. The wall hydrant can optionally be referred to as a freeze resistant hydrant. The wall hydrant can be of any suitable type provided with a valve assembly or fitting located at a first or inner end of an outlet tube and a housing or faucet located at the second or outer end of the outlet tube. The wall hydrant can include a stem element or member having an inner end coupled to the valve assembly for opening and closing the valve assembly and an outer end coupled to the housing or faucet for controlling the opening and closing of the valve assembly at the housing. The valve assembly can optionally be provided with a valve part movable between a closed position for closing the valve assembly and an opened position for opening the valve assembly. The inner end of the stem can optionally be coupled to the valve part.

The outlet tube can be made from any suitable material, optionally including a cross-linked polyethylene (PEX), a cross-linked high density polyethylene (HDPE), a cross-linked medium density polyethylene (MDPE), a peroxide cross-linked polyethylene, a peroxide cross-linked high density polyethylene, PEX-A, a silane cross-linked polyethylene, a silane cross-linked high density polyethylene, PEX-B, an electron beam cross-linked polyethylene, an electron beam cross-linked high density polyethylene, PEX-C, an azo cross-linked polyethylene, an azo cross-linked high density polyethylene, PEX-D, a bendable PEX, an expandable PEX, a bendable plastic, a flexible plastic, an expandable plastic, a shape memory plastic, a memory plastic, a high temperature plastic—for example for use with water or other liquids above 140 degrees, a freeze resistant plastic, a chlorine resistant plastic, a pressure-surge dissipation plastic, a plastic suitable for transmitting pressurized liquids or other fluids, a corrosion resistant plastic, a plastic suitable for transport of potable water or any combination of the foregoing.

The stem element or member can be made from any suitable material, optionally including a cross-linked polyethylene (PEX), a cross-linked high density polyethylene (HDPE), a cross-linked medium density polyethylene (MDPE), a peroxide cross-linked polyethylene, a peroxide cross-linked high density polyethylene, PEX-A, a silane cross-linked polyethylene, a silane cross-linked high density polyethylene, PEX-B, an electron beam cross-linked polyethylene, an electron beam cross-linked high density polyethylene. PEX-C, an azo cross-linked polyethylene, an azo cross-linked high density polyethylene. PEX-D, a bendable PEX, an expandable PEX, a bendable plastic, a flexible plastic, an expandable plastic, a shape memory plastic, a memory plastic, a high temperature plastic—for example for use with water or other liquids above 140 degrees, a freeze resistant plastic, a chlorine resistant plastic, a pressure-surge dissipation plastic, a plastic suitable for transmitting pressurized liquids or other fluids, a corrosion resistant plastic, a plastic suitable for transport of potable water or any combination of the foregoing.

The wall hydrant can optionally be installed in the external wall of the building structure so that the housing or faucet is located outside of the building structure, for example optionally attached to the outside of the external wall. The valve assembly of an installed wall hydrant can optionally be located inside the building structure. When the wall hydrant is installed, the valve assembly is optionally located in a region of the building structure that is not typically subjected to freezing temperatures when housing or faucet is subjected to freezing temperatures outside the building structure.

The outlet tube can optionally be retained, or further secured, on the housing or faucet by a securement ring of any suitable type. The securement ring can optionally be a metal crimp. The securement ring can be made from any suitable material, optionally including a cross-linked poly- ethylene (PEX), a cross-linked high density polyethylene (HDPE), a cross-linked medium density polyethylene (MDPE), a peroxide cross-linked polyethylene, a peroxide cross-linked high density polyethylene, PEX-A, a bendable PEX, an expandable PEX, an expandable plastic, a shape memory plastic, a memory plastic or any combination of the foregoing.

The stem can optionally be a tube to permit draining of the outlet tube when the fluid closure valve is closed and fluid remaining in the outlet tube becomes pressurized. Such pressurization of fluid remaining in the outlet tube can occur from any number of events, optionally including for example freezing of liquid within the outlet tube, freezing of liquid in a hose connected to the housing or faucet, a loss of pressure in the liquid or fluid being supplied to the valve assembly or other fitting or any combination of the forego- ing. The valve assembly can optionally be provided with a drain hole for draining the outlet tube. The drain hole can optionally be provided in a movable valve part of the valve assembly. The valve part can optionally be movable between a first position for closing the drain hole and a second position for opening the drain hole.

The wall hydrant of the invention can be of any suitable type, and can include any combination foregoing. A sample wall hydrant 21 of the invention, which can optionally be referred to as a freeze resistant hydrant, is described in FIGS. 1-9 and includes an outlet tube 22 having a first or inner or inlet end 22a and an opposite second or outer or outlet end 22b. The outlet tube 22 has an inner passageway or bore 23 extending between ends 22a and 22b. The outlet tube can optionally be referred to as an outer tube, a pipe or a tubular member. The outlet tube 22 can be adapted to extend through an external or outer wall of a building (not shown). The tube 22 can optionally have a length, extending along its longi- tudinal axis 24, at least as great as the thickness of the external wall.

The outlet tube 22 can be made from any suitable mate- rial, optionally including a cross-linked polyethylene (PEX), a cross-linked high density polyethylene (HDPE), a cross- linked medium density polyethylene (MDPE), a peroxide cross-linked polyethylene, a peroxide cross-linked high den- sity polyethylene, PEX-A, a silane cross-linked polyethyl- ene, a silane cross-linked high density polyethylene, PEX-B, an electron beam cross-linked polyethylene, an electron beam cross-linked high density polyethylene, PEX-C, an azo cross-linked polyethylene, an azo cross-linked high density polyethylene, PEX-D, a bendable PEX, an expandable PEX, a bendable plastic, a flexible plastic, an expandable plastic, a shape memory plastic, a memory plastic, a high tempera- ture plastic—for example for use with water or other liquids above 140 degrees, a freeze resistant plastic, a chlorine resistant plastic, a pressure-surge dissipation plastic, a plas- tic suitable for transmitting pressurized liquids or other fluids, a corrosion resistant plastic, a plastic suitable for transport of potable water or any combination of the fore- going. The outlet tube 22 can optionally be made from a cross-linked polyethylene (PEX), for example peroxide cross-linked high density polyethylene or PEX-A, which is an expandable plastic.

Wall hydrant 22 can optionally include a stem 26 having first or inner end 26a and a second or outer end 26b. Stem 26 extends through outlet tube 22, for example along the longitudinal axis 24 within passageway 23 of the tube 22, and can optionally extend coaxially with the tube 22. The passageway 23 of the tube 22 with stem 26 extending therethrough can optionally be referred to as an annular passageway 23. Stem 26 can optionally be a tubular member or tube provided with an inner passageway or bore 27 extending between ends 26a and 26b, which can optionally be referred to as inlet end 26a and outlet end 26b. The stem 26 can optionally have a length, extending along the longi- tudinal axis 24 of the outlet tube 22, at least as great as the thickness of the external wall. The stem 26 can optionally have a length approximating the length of the outlet tube 22.

The stem 26 can be made from any suitable material, optionally including a cross-linked polyethylene (PEX), a cross-linked high density polyethylene (HDPE), a cross- linked medium density polyethylene (MDPE), a peroxide cross-linked polyethylene, a peroxide cross-linked high den- sity polyethylene, PEX-A, a silane cross-linked polyethyl- ene, a silane cross-linked high density polyethylene, PEX-B, an electron beam cross-linked polyethylene, an electron beam cross-linked high density polyethylene, PEX-C, an azo cross-linked polyethylene, an azo cross-linked high density polyethylene, PEX-D, a bendable PEX, an expandable PEX, a bendable plastic, a flexible plastic, an expandable plastic, a shape memory plastic, a memory plastic, a high tempera- ture plastic—for example for use with water or other liquids above 140 degrees, a freeze resistant plastic, a chlorine resistant plastic, a pressure-surge dissipation plastic, a plas- tic suitable for transmitting pressurized liquids or other fluids, a corrosion resistant plastic, a plastic suitable for transport of potable water or any combination of the fore- going. The stem 26 can optionally be made from a cross- linked polyethylene (PEX), for example peroxide cross- linked high density polyethylene or PEX-A, which is an expandable plastic.

The wall hydrant 21 can optionally include a fitting 31 coupled or joined to the inner end 22a of the outlet tube 22 for coupling the wall hydrant to a suitable water or other fluid or liquid supply, for example a water supply (not shown) from within the building. Fitting 31 can be of any suitable type and can optionally include a valve assembly 32 for regulating the flow of water to the hydrant. The wall hydrant 21 can be configured, for example by means of the length to tube 22 and stem 26, so that the fitting 31, the valve assembly 32 or both or located inside the building or in an area not subject to freezing when the hydrant is installed in the building. The valve assembly 32 can optionally be referred to as a fluid or liquid closure valve.

Figure 3:
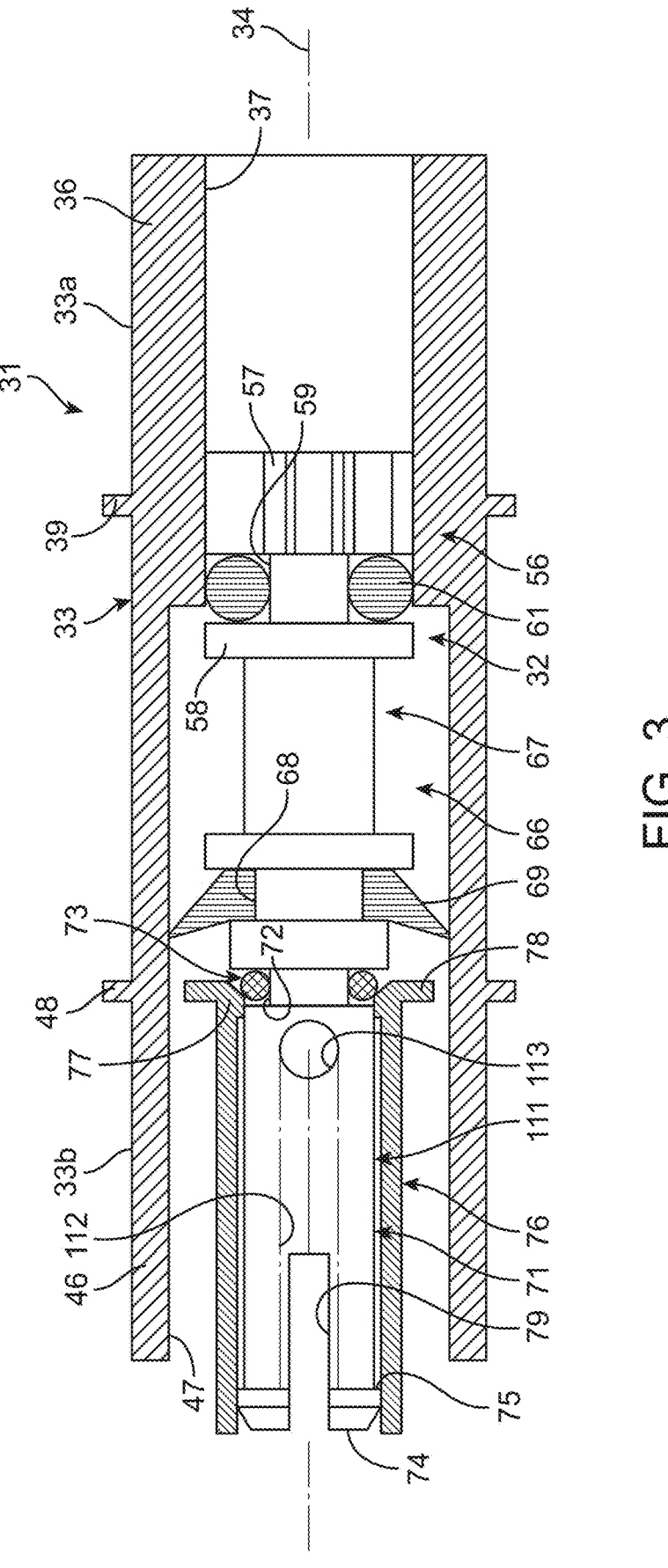
FIG. 3 is an enlarged cross-sectional view of the valve assembly of the inner end of the freeze resistant wall hydrant of FIG. 1 in the second or closed position of FIG. 4.

Fitting 31 can optionally include a tubular body 33 made from metal, plastic or any other suitable material and having a first or inner end 33a and an opposite second or outer end 33b and extend along a central longitudinal axis 34 extend- ing between ends 33a,33b (see FIGS. 1-3). The first end 33a can include a first or inner annular wall 36 provided with a first internal bore 37, which can optionally be axially cen- tered in wall 36 and optionally be cylindrical in shape. The outside of the first annular wall can optionally serve as a nipple or annular seat for slidably or otherwise receiving or joining to a supply tube or line 38 of the water supply. The first annular wall is optionally provided with a first circular flange 39 around its outside for limiting the longitudinal travel of the supply tube 38 thereon. For example, the supply tube can slide over the end of the first annular wall as far as flange 39 and be secured to the annular wall 36 by any suitable means, for example a compression ring 40 of any suitable type. The second end 33b can include a second or outer annular wall 46 provided with a second internal bore 47, which can optionally be axially centered in second annular wall 46 and optionally be cylindrical in shape. The outside of the second annular wall can optionally serve as a nipple or annular seat for slidably or otherwise receiving the inner end 22a of outlet tube 22. The second annular wall is optionally provided with a second circular flange 48 around its outside for limiting the longitudinal travel of the tube 22 thereon during connection of the outlet tube to the fitting 31. For example, the inner end 22a of the outlet tube can slide over the end of the second annular wall as far as second flange 48 and be secured to the second annular wall 46 by any suitable means. In this regard, for example, when outlet tube 22 is formed from an expandable plastic or material, for example PEX-A, the inner end 22a of the outlet tube can be radially expanded in any suitable manner, for example under the force of a suitable expansion tool, so as to fit over the end of the second annular wall before naturally reducing in diameter so as to compress about the wall 46 and form a friction fit on and around the wall 46. Such a connection of the inner end 22a to annular wall 46 can optionally be called an expansion connection. The securement of the outlet tube to second annular wall 46 can optionally be enhanced by a compression or crimp ring 49 of any suitable type. For example, the compression ring 49 can optionally be formed of an expandable plastic or material, for example PEX-A, and be radially expanded so as to fit over the inner end 22a and wall 46 before naturally reducing in diameter to compress about the end 22a and wall 46. The additional securement force of compression ring 49 may be particularly advantageous when the water or other fluid being carried by outlet tube 22 is highly pressurized. The central longitudinal axis 34 of tubular body 33 is optionally coaxial with the longitudinal axis 24 of outlet tube 22 when the outlet tube is joined to body 33 and thus fitting 31.

The first annular wall 36 can optionally be referred to as a valve seat and be included in valve assembly 32. The valve assembly 32 can further include a movable valve part 56 slidable within the first bore 37 and optionally having a plurality of radially extending fins 57 for slidaby engaging the inside of the first annular wall 36 so as to guide the slidable movement of the valve part 56 within the bore 37. The valve part can further include an annulus 58 separated from fins 57 by an annular slot 59. The annulus and fins each have an outer surface approximating the shape and dimension of the inner surface of bore 37, and optionally each have an outer dimension slightly less that the inner dimension of the bore 37 so as to permit slidable engagement with the inside of bore 37. Any suitable annular elastomeric element such as an O-ring 61 is disposed in annular slot 59 for selective scalable engagement with the inside of bore 37. Valve part 56 is movable relative to bore 37 between a first position for closing valve assembly 32 (see FIGS. 4-5) and a second position for opening the valve assembly (see FIGS. 1-2). For example, in its first or closed position, the O-ring 61 of the part 56 is disposed in bore 37 so as to inhibit, restrict or preclude the flow of water from supply tube 38 to pass through the bore 37 and valve assembly 32 (see FIGS. 3-5). Annulus 58 of the valve part 56 can optionally be within or outside of the bore 37 when the valve assembly is closed. In its second or opened position, the O-ring is disposed outside of bore 37 so as to permit the water from the supply tube to flow through bore 37 and valve assembly 32 (see FIGS. 1-2). Fins 57 are optionally within the bore 37 when the valve part is in its opened position, and optionally serve to keep the valve part aligned with the bore 37.

The movable valve part 56 is coupled to inner end 26b of stem 26 in any suitable manner to permit the stem for control the opening and closing of valve assembly 32. The stem 26 can optionally be referred to as a control stem or control tube. Valve part 56 is optionally part of an elongate element or member 66 that is movable longitudinally within tubular body 33. The elongate element 66, which can optionally be centered on central longitudinal axis 34 of tubular body 33, can optionally be referred to as a cartridge, valve cartridge, valve element or member, elongate element, elongate member, control element or member or any combination of the foregoing. The elongate element is made from any suitable material such as plastic or metal. The valve part 56 can optionally be referred to as the first or inner component, end or portion of elongate element 66. The elongate element 66 can optionally have a central portion 67 disposed within second bore 47 of second annular wall 46 and provided with an annular slot 68. Any suitable annular elastomeric element such as one-way annular seal 69 or check seal, optionally made from rubber, is disposed in slot 68. The check seal 69 serves as a check valve, sealably engaging against the inside of the second bore 47 in its first or closed position but disengaging from the inside of the bore 47 when exposed to a fluid of a predetermined pressure, for example from supply tube 38. When so moved or deformed to its second, disengaged or opened position, the check seal 69 permits the fluid from supply tube 38 to pass and travel out of the second bore 47 into the outlet tube 22. Elongate element 66 further includes a neck 71, which can optionally be referred to as an end piece, which is joined to central portion 67 and extends from the central portion in an opposite direction as valve part 57. The elongate element is provided with an annular slot 72 between the central portion 67 and neck 71 for receiving any suitable annular elastomeric element such as an O-ring 73. The front end of neck 71 can optionally be provided with enlarged cap 74 having a forward taper and an opposite annular capture flange 75.

An elongate tubular member, which can optionally be referred to as a stem 76, is slidably and rotatably disposed over neck 71. The stem is optionally centered on central longitudinal axis 34 of tubular body 33 and optionally includes an inner end 77 provided with a radially extending annular flange 78 that faces central portion 67 of the elongate element 66. The front portion of neck 71 can optionally be provided with at least one longitudinal slot 79 which permits the enlarged cap 74 to radially compress as the forward taper of the cap 74 is pressed against the flange 78 to insert the neck 71 into the stem 76. The inner end of the stem 76 can slidably abut O-ring 73 of neck 71 so as to provide a fluid-tight seal that inhibits, restricts or precludes fluid such as water from traveling between stem 76 and neck 71 (see FIG. 2). Stem 76 can optionally serve as a nipple or annular seat for slidably or otherwise receiving the inner end 26a of control stem 26 when the stem 26 is a tubular member or tube. Flange 78 can optionally limit the longitudinal travel of the inner end 26a on the tubular stem 76 during connection of the control stem to the stem 76. For example, the inner end 26a of the tubular control stem can slide over the end of the stem 76 as far as flange 78 and be secured to stem 76 by any suitable means. In this regard, for example, when the control stem 26 is formed from an expandable plastic or material, for example PEX-A, the inner end 26a of the control stem can be radially expanded so as to fit over the end of the stem 76 before reducing in diameter so as to compress about the stem 76 and form a friction fit on and around the stem 76 (see FIG. 2). Such a connection of the inner end 26a to stem 76 can optionally be called an expansion connection. The securement of the control stem to stem 76 can optionally be enhanced by a compression or crimp ring (not shown) of any suitable type.

Wall hydrant 21 can optionally include a housing or faucet 91, which can be optionally referred to as an outdoor housing or outdoor faucet (see FIG. 1). Faucet 91 can include a hollow body 92 made from any suitable material such as bronze, metal or plastic. The hollow body 92 can include a nipple 93, which extends from an outwardly extending radial flange 94 and can optionally be referred to as an annular seat, for receiving outer end 22*b* of the outlet tube 22. Flange 94 can optionally serve to limit the longitudinal travel of the tube 22 onto the nipple 93 during connection of the outlet tube to the faucet 91. For example, the outer end 22*b* of the outlet tube can slide over the end of the nipple 93 as far as flange 94 and be secured to the nipple by any suitable means. In this regard, for example, when the outlet tube 22 is formed from an expandable plastic or material, for example PEX-A, the outer end 22*b* can be radially expanded so as to fit over the end of the nipple before naturally reducing in diameter so as to compress about the nipple and form a friction fit on and around the nipple. Such a connection of the outer end 22*b* to nipple or annular seat 93 can optionally be called an expansion connection. The securement of the outlet tube to nipple 93 can optionally be enhanced by a compression or crimp ring 96 of any suitable type. For example, the compression ring 96 can optionally be formed of an expandable plastic or material, for example PEX-A, and be radially expanded so as to fit over the outer end 22*b* and nipple 93 before naturally reducing in diameter to compress about the end 22*b* and nipple 93.

The hollow body 92 includes a suitable outlet 97, for example a threaded nipple 97. The outlet 97 is provided with an opening 98 in communication with the passageway 23 of outlet tube 22 for delivering water or other fluid through the hydrant 21 from the supply tube 38.

Hollow body 92 includes a handle 101 coupled to outer end 26*b* of the control stem 26 in any suitable manner for opening and closing valve assembly 32 within fitting 31. The handle 101 is joined to the outer end of a spindle 102 that rotatably extends thorough a bore in bonnet 103, which is sealably secured within an opening 104 in the outside of the faucet 91 so as to provide a fluid-tight seal between the bonnet and the faucet. The handle 101 and spindle 102 can optionally be centered on longitudinal axis 24 of the outlet tube 22. Any suitable seal can be provided between the spindle 102 and the bonnet 103 so as to preclude the passage of water or other fluid between the spindle and the bonnet. For example, an O-ring 106 or other suitable elastomeric element or member can be provided around the spindle in an annular slot of the bonnet. The inner end of the spindle 102 extends through the bonnet 103 into the inside of the hollow body. The outer end 26*b* of control stem, when the control stem is a tubular member, can be sealably secured around the inner end of the spindle in any suitable manner. For example, when the control stem or tube 26 is formed from an expandable plastic or material, for example PEX-A, the outer end 26*b* can be radially expanded so as to fit over the inner end of the spindle before naturally reducing in diameter so as to compress about the spindle and form a friction fit on and around the spindle. Such a connection of the outer end 22*b* to the inner end of the spindle can optionally be called an expansion connection. The securement of the control stem or tube 26 to spindle 102 can optionally be enhanced by a compression or crimp ring (not shown) of any suitable type, for example as discussed above. The distal end of the bore in bonnet 103 and the distal end of spindle 102 can be cooperatively threaded so that rotation of the spindle in the bonnet causes the spindle to move longitudinally inwardly or outwardly within the bonnet. Such external threads 105 of spindle are labelled in FIGS. 1 and 4. Rotation of the handle 101 relative to the bonnet 103 and hollow body 92 rotates the spindle 102 and the control stem 26 secured to the spindle and simultaneously moves the spindle longitudinally relative to the hollow body 92 and the control stem longitudinally within the outlet tube 22.

Rotation of the handle 101 in a first direction to a first position, for example in a clockwise direction, serves to close valve assembly 32 (see FIGS. 4-5), while rotation of the handle in a second direction opposite to the first direction to a second position, for example in a counterclockwise direction, serves to open the valve assembly (see FIGS. 1-2). Closing of the handle urges stem 76, under the force of the control stem 26, against O-ring 73 and pushes elongate element 66 towards the first annular wall 36 so as to move O-ring 61 of the movable valve part 56 into first bore 37 of the first annular wall 36. The O-ring 61 provides a fluid-tight seal against the inner surface of bore 37 so as to preclude the flow of fluid from supply tube 38 through the first bore 37 and thus through the wall hydrant 21. Opening of the handle 101 causes stem 76 to move away from the first annular wall 36. The pressure of the supply fluid from the supply tube 38 continues to urge the elongate element 66 and its O-ring 73 against the stem 76 and move O-ring 61 out of first bore 37 so as to permit the supply water or other fluid to flow through the valve assembly 32 of fitting 31. The pressurized supply fluid deflects one-way check valve or seal 69 so as to disengage the seal 69 from the inside wall of second bore 47 and thus open the check seal. The movement of check seal 69 to its opened positions permits the supply fluid to flow past the seal 69 into outlet tube 22 and out opening 98 of the faucet 91.

Wall hydrant 21 can optionally be provided with a draining feature or means which permits any water or other fluid remaining within passageway 23 of outlet tube 22 under certain circumstances when valve assembly 32 is in its closed position to drain from the outlet tube. For example, remaining water within the outlet tube may be precluded from draining from outlet 97 in faucet 91 by trapped water in the faucet or in a hose connected to the faucet becoming frozen. The expansion of such trapped water upon freezing can undesirably pressurize the remaining water, possibly causing the outlet tube to burst. In another example, water hammer in the supply tube 38 or upstream of the supply tube can undesirably result in a loss of pressure or a negative pressure which draws any remaining water within the wall hydrant upstream into the supply tube 38 and possibly contaminate the water supply within the building. The wall hydrant 21 is configured, or provided with an additional or secondary draining feature 111, to drain the remaining water in the outlet tube 22 and faucet 91 in each of the foregoing examples.

The additional or secondary draining feature 111 of wall hydrant 21 can be of any suitable type. For example, neck 71 can be provided with an internal bore 112, optionally coaxial or centered on central longitudinal axis 34, which communicates with a side opening or hole 113 in the neck near O-ring 73 (see FIG. 3). The forward or outer end of the internal bore 112 opens into the passageway 27 of control tube 26. Faucet spindle 102 can optionally be tubular and formed with a drain passageway or bore (not shown) that is included in the additional or secondary draining feature 111. The inner end of the drain bore in spindle 102 communicates with passageway 27 of the control tube. The outer end of the spindle drain bore communicates with a side opening or hole 116 outside of the bonnet 103, for example in handle 101.

Figures 4, 5:
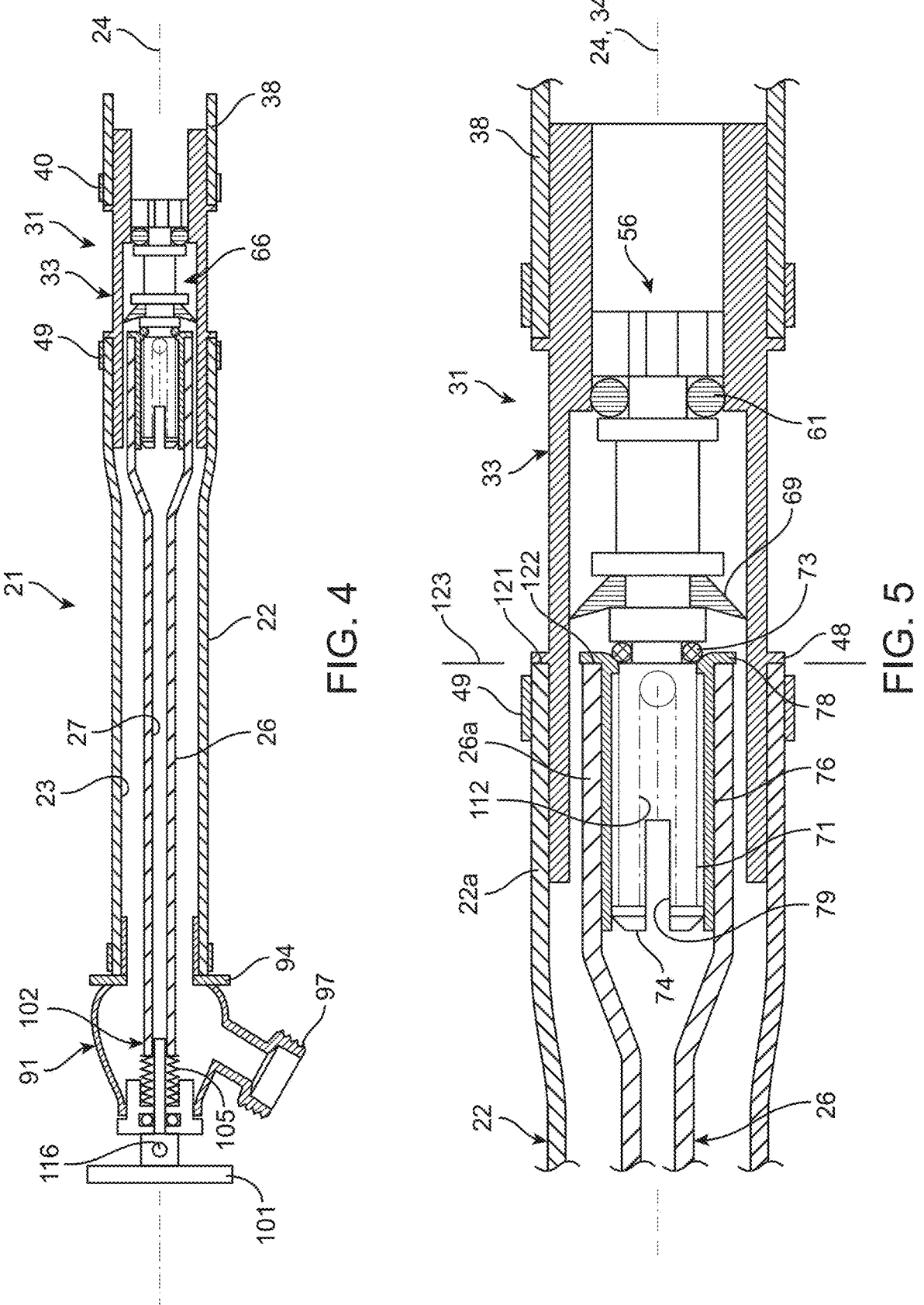
FIG. 4 is a schematic cross-sectional view, similar to FIG. 1, of the freeze resistant wall hydrant of FIG. 1 in a second or closed configuration.
FIG. 5 is an enlarged cross-sectional view, similar to FIG. 2, of a portion of the inner end of the freeze resistant wall hydrant of FIG. 4 in the second or closed configuration.
Figures 6, 7:
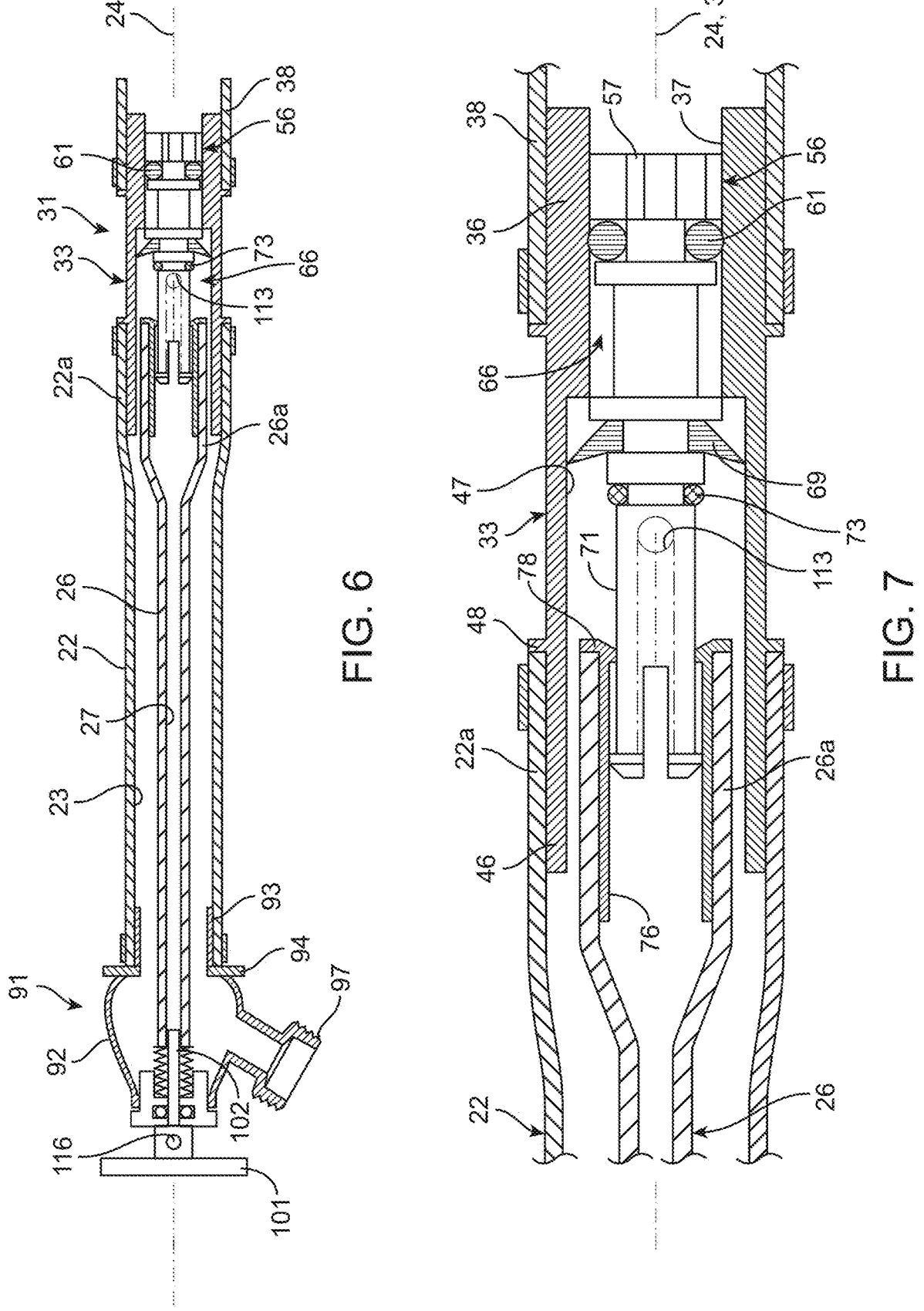
FIG. 6 is a schematic cross-sectional view, similar to FIG. 1, of the freeze resistant wall hydrant of FIG. 1 in a third or draining configuration.
FIG. 7 is an enlarged cross-sectional view, similar to FIG. 2, of a portion of the inner end of the freeze resistant wall hydrant of FIG. 4 in the third or draining configuration

The undesirable pressurization of any remaining water in control tube 22 triggers secondary draining feature 111 by urging check seal 69 to travel in second bore 47 away from stem 76 (see FIGS. 4-5). The check seal remains engaged with the inside of the bore 47 during such longitudinal travel so as to remain sealably engaged with the inside of the bore 47. The elongate element or cartridge 66 travels longitudinally with the check seal 69 causing movable valve part 56, including O-ring 61, to move further within first bore 37 from its closed position to a third position, which can be referred to as a second closed or sealed position (see FIGS. 6-7). O-ring 61 continues to sealably engage the inside of the third bore 37 in such third position. The check seal 69 moves longitudinally away from the stem 76 a sufficient distance so as to cause O-ring 73 on the neck 71 to sealably disengage from flange 78 and stem 76 and thus permit the remaining water to escape through side opening 113, internal bore 112, passageway 27 and spindle 102 and outside opening 116. The amount of pressure in the remaining water will determine the length of the longitudinal travel of check 69 as further travel of the check valve will initially further increase access to side opening 113 until the side opening is fully outside stem 76, for example as shown in FIGS. 6-7. Similarly, any loss of pressure or a negative pressure within the supply tube 38 will draw check seal 69 away from stem 76 so as to sealably disengage the O-ring 73 from the stem 76 and permit any remaining water in the outlet tube 22 to escape or drain through side opening 113 in the manner discussed above. Neck 71 slides rearwardly inside stem 76 to expose side opening 113. The movable valve part 56 is configured so that O-ring 61 remains in scalable engagement with the inside of the first bore 37 throughout the travel of the O-ring 61 between its closed position, shown in FIGS. 4-5, and its third position, shown in FIGS. 6-7. The engagement of capture wall 75 of the enlarged cap 74 of the neck with an inner annular surface of flange 78 of the stem 76 serves to limit the longitudinal or rearward travel of check valve 69 and movable valve part 56 relative to stem 76 and within tubular body 33.

In operation and use, the wall hydrant of the invention can be installed in an external wall of a building in a conventional manner. When outlet tube 22 is made from a flexible or bendable material, for example a cross-linked polyethylene such as PEX, the flexibility or bendability of the outlet tube can facilitate such installation. For example, the outlet tube can be deformed for bent on site by the installer to a desired shape, including a curved or angled shaped. Such bending or deformation can be temporary, to permit installation, or permanent. Control stem 26 can optionally be made from a flexible or bendable material, for example a cross-linked polyethylene or PEX, to facilitate such installation. The outlet tube 22 and control stem 26 can optionally be made from the same flexible or bendable material. Flange 94 of the faucet 91 can be utilized to secure the wall hydrant to the external wall, for example the exterior of the external wall.

The wall hydrant of the invention can be resized on site by the installer, for example when the installer determines at the site of installation that a wall hydrant having a shorter length is needed. In this regard, for example, when the valve assembly 32 of wall hydrant 21 is in a closed position, as shown in FIGS. 4-5, an end face 121 of the inner end 22*a* of outlet tube 22 and an end face 122 or the inner end 26*a* of control stem 26 can each optionally extend in a same plane extending perpendicular to longitudinal axis 24 of the outlet tube, for example end plane 123 shown in FIG. 5. Optionally, the outer or end face of flange 48 of tubular body 33 and the outer or end face of flange 78 of stem 76 extend in a same plane extending perpendicular to central longitudinal axis 34, for example end plane 123 shown in FIG. 5. As discussed above, end face 121 or the inner end 22*a* of the outlet tube 22 can optionally abut the outer face of flange 48 and end face 122 of the inner end 26*a* of the control stem 26 can optionally abut the outer face of flange 78.

Figures 8, 9:
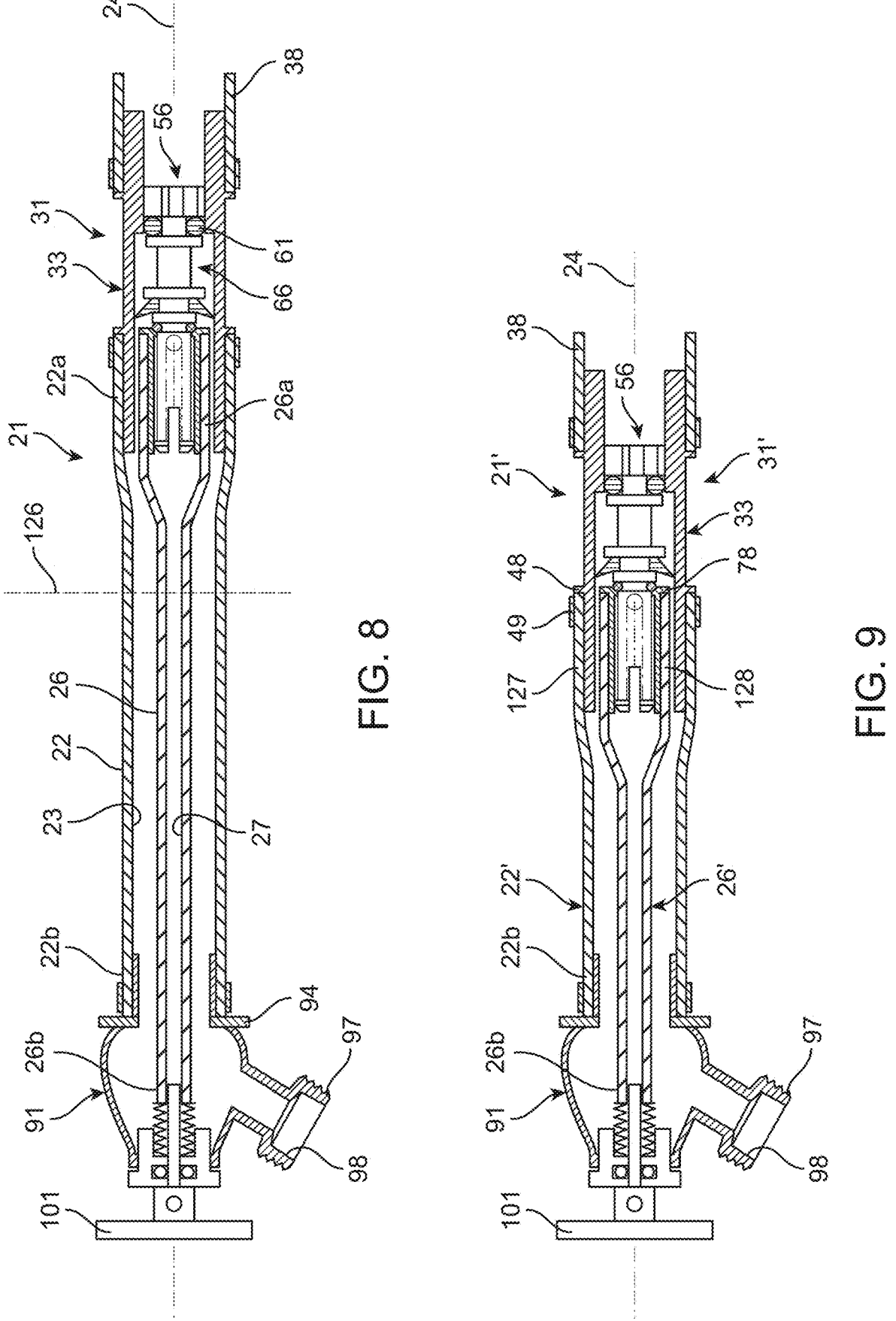
FIG. 8 is a schematic cross-sectional view, similar to FIG. 4, of the freeze resistant wall hydrant of FIG. 1 in the second or closed configuration and having an imaginary cut line extending through the outlet tube and stem of the wall hydrant.
FIG. 9 is a schematic cross-sectional view of the freeze resistant wall hydrant of FIG. 1 in which the outlet tube and stem, severed along the imaginary cut line of FIG. 8, is attached at the cut line to an additional valve assembly illustrated in FIG. 3.

In a sample operation of shortening the length of a wall hydrant 21 of the invention, for example when outlet tube 22 and control stem 26 are both made from a cross-linked polyethylene such as PEX, the outlet tube and control stem can be easily cut by the installer, for example by means of a conventional flexible tube cutter or PEX tubing cutter. The cutting of the outlet tube and control stem can optionally occur in a single slice, for example by the tube cutter. A sample cutting plane 126 is illustrated in FIG. 8. The shortened or cut outlet tube 22' now has a new inner end 127, which can be referred to as a cut end 127, and the shortened or cut control stem 26' now has a new inner end 128, which can be referred to as a cut end 128 (see FIG. 9), both of which can now be suitably joined to an additional or second fitting 31' of the invention, for example a fitting 31 shown in FIG. 3, to form a shortened wall hydrant 21'. In this regard, the shortened outlet tube 22' can be joined or secured to second annular wall 46 of the second fitting 31' in the manner discussed above. For example, when outlet tube 22 is formed from an expandable plastic or material, for example PEX-A, the new inner end 127 of the outlet tube can be radially expanded in any suitable manner, for example under the force of a suitable expansion tool, so as to fit over the end of the second annular wall and optionally pressed up against flange 48 of the tubular body 33. The new inner end 127 will naturally reduce in diameter so as to compress about the wall 46 and form a friction fit on and around the wall 46. The connection of the new inner end 127 to second annular wall 46 can optionally be called an expansion connection. The securement of the new inner end 127 to second annular wall 46 can optionally be enhanced by a compression or crimp ring 49 of any suitable type. For example, the compression ring 49 can optionally be formed of an expandable plastic or material, for example PEX-A, and be radially expanded so as to fit over the new inner end and wall 46 before naturally reducing in diameter to compress about the new inner end 127 and wall 46. The shortened control stem 26' can be joined or secured to a stem 76 of the second fitting 31' in the manner discussed above. For example, when control stem 26 is formed from an expandable plastic or material, for example PEX-A, the new inner end 128 of the control stem can be radially expanded in any suitable manner, for example under the force of a suitable expansion tool, so as to fit over the end of the stem 76 optionally pressed up against flange 78 of the stem. The new inner end 128 will naturally reduce in diameter so as to compress about the stem 76 and form a friction fit on and around the stem. The connection of the new inner end 128 to stem 76 of the second fitting 31' can optionally be called an expansion connection. The securement of the new inner end 128 to stem 76 can optionally be enhanced by a compression or crimp ring of any suitable type. The alignment of the end face of the new inner end 127 of the shortened outlet tube 22' with the outer face of the flange 48 and the alignment of the end face of the new inner end 128 of the shortened control stem 26' with the outer face of the flange 78 facilitate proper placement or attachment of the outlet tube and control stem on the second fitting 31 and proper operation of the shortened wall hydrant 21'.

The wall hydrant and method of the invention permit a wall hydrant to be manufactured in a single length for use in walls of varying thickness. The resizing of the lengths of the outlet tube and control stem can occur at the site of installation of the wall hydrant, before installation anywhere or anywhere else at any time. The resizing of the lengths of the outlet tube and control stem can optionally occur during manufacture of the wall hydrant. For example, the outlet tube and control stem can be connected to the faucet in approximate lengths and then cut, for example in a single slice, to a desired respective length before connection to the fitting.

I claim:

1. A method for resizing a length of a freeze resistant wall hydrant for use with an external wall of a building and a water supply and including an outlet tube made from a cross-linked polyethylene (PEX) for extending through the external wall and having a length and an outer end and an opposite inner end, an outdoor housing joined to the outer end of the outlet tube for securing to the building outside the external wall, a fitting joined to the inner end of the outlet tube with an expansion connection for coupling to the water supply, the fitting including a fluid closure valve having a valve part movable between a first position for closing the valve and a second position for opening the valve, the outdoor housing including handle, a stem made from PEX extending through the outlet tube and having an outer end coupled to the handle and an inner end coupled to the valve part with an expansion connection, the handle movable between a first position for moving the valve part to its first position to close the valve and a second position for moving the valve part to its second position to open the valve, the method comprising the steps of cutting through both the outlet tube and the stem in a single slice to form a cut end of the outlet tube and a cut end of the stem, joining the cut end of the stem to a valve part of an additional fitting with an expansion connection and joining the cut end of the outlet tube to the additional fitting with an expansion connection to provide the wall hydrant with a resized length whereby the wall hydrant can be manufactured in a single length for use in walls of varying thicknesses.

2. The method of claim 1, wherein the stem has an internal passageway to permit draining of the outlet tube when the fluid closure valve is in its off position and fluid remaining in the outlet tube becomes pressurized.

3. The method of claim 1, wherein the cross-linked polyethylene (PEX) of at least one of the outlet tube and the stem is selected from the group consisting of a cross-linked high density polyethylene (HDPE), a cross-linked medium density polyethylene (MDPE), a peroxide cross-linked polyethylene, a peroxide cross-linked high density polyethylene, PEX-A, a silane cross-linked polyethylene, a silane cross-linked high density polyethylene, PEX-B, an electron beam cross-linked polyethylene, an electron beam cross-linked high density polyethylene, PEX-C, an azo cross-linked polyethylene, an azo cross-linked high density polyethylene, PEX-D, a bendable PEX, an expandable PEX and any combination of the foregoing.

4. The method of claim 1, wherein the cross-linked polyethylene (PEX) of both the outlet tube and the stem is selected from the group consisting of a cross-linked high density polyethylene (HDPE), a cross-linked medium density polyethylene (MDPE), a peroxide cross-linked polyethylene, a peroxide cross-linked high density polyethylene, PEX-A, a silane cross-linked polyethylene, a silane cross-linked high density polyethylene, PEX-B, an electron beam cross-linked polyethylene, an electron beam cross-linked high density polyethylene, PEX-C, an azo cross-linked polyethylene, an azo cross-linked high density polyethylene, PEX-D, a bendable PEX, an expandable PEX and any combination of the foregoing.

5. The method of claim 1, wherein the external wall has a thickness and the outlet tube has a length at least equal to the thickness of the external wall.

6. The method of claim 1, wherein the outlet tube extends along a longitudinal axis to an end face at its inner end that lies in a plane perpendicular to the longitudinal axis and the stem has an end face at its inner end that lies in the plane.

7. The method of claim 1, wherein in the fitting extends along a longitudinal axis and has an annular seat for receiving the inner end of the outlet tube in an expansion connection and the valve part has an annular seat for receiving the inner end of the stem in an expansion connection, the annular seat of the fitting having an end face that lies in a plane perpendicular to the longitudinal axis of the fitting and the annular seat of the valve part having an end face that lies in the plane when the valve part is in its first position for facilitating attachment of the cut end of the outlet tube to the additional fitting and the cut end of the stem to the valve part of the additional fitting.

8. A method for resizing a length of a freeze resistant wall hydrant for use with an external wall of a building and a water supply and including an outlet tube made from a flexible plastic for extending through the external wall and having a length and an outer end and an opposite inner end, an outdoor housing joined to the outer end of the outlet tube for securing to the building outside the external wall, a fitting joined to the inner end of the outlet tube with an expansion connection for coupling to the water supply, the fitting including a fluid closure valve having a valve part movable between a first position for closing the valve and a second position for opening the valve, the outdoor housing including handle, a stem made from a flexible plastic extending through the outlet tube and having an outer end coupled to the handle and an inner end coupled to the valve part with an expansion connection, the handle movable between a first position for moving the valve part to its first position to close the valve and a second position for moving the valve part to its second position to open the valve, the method comprising the steps of cutting through both the outlet tube and the stem in a single slice to form a cut end of the outlet tube and a cut end of the stem, joining the cut end of the stem to a valve part of an additional fitting with an expansion connection and joining the cut end of the outlet tube to the additional fitting with an expansion connection to provide the wall hydrant with a resized length whereby the wall hydrant can be manufactured in a single length for use in walls of varying thicknesses.

9. The method of claim 8, wherein the stem has an internal passageway to permit draining of the outlet tube when the fluid closure valve is in its off position and fluid remaining in the outlet tube becomes pressurized.

10. The method of claim 8, wherein the external wall has a thickness and the outlet tube has a length at least equal to the thickness of the external wall.

11. The method of claim 8, wherein the outlet tube extends along a longitudinal axis to an end face at its inner end that lies in a plane perpendicular to the longitudinal axis and the stem has an end face at its inner end that lies in the plane.

12. The method of claim 8, wherein in the fitting extends along a longitudinal axis and has an annular seat for receiving the inner end of the outlet tube in an expansion connection and the valve part has an annular seat for receiving the inner end of the stem in an expansion connection, the annular seat of the fitting having an end face that lies in a plane perpendicular to the longitudinal axis of the fitting and the annular seat of the valve part having an end face that lies in the plane when the valve part is in its first position for facilitating attachment of the cut end of the outlet tube to the additional fitting and the cut end of the stem to the valve part of the additional fitting.

13. The method of claim 8, wherein the flexible plastic of at least one of the outlet tube and the flexible plastic of the stem is selected from the group consisting of a cross-linked polyethylene (PEX), a cross-linked high density polyethylene (HDPE), a cross-linked medium density polyethylene (MDPE), a peroxide cross-linked polyethylene, a peroxide cross-linked high density polyethylene, PEX-A, a silane cross-linked polyethylene, a silane cross-linked high density polyethylene, PEX-B, an electron beam cross-linked polyethylene, an electron beam cross-linked high density polyethylene, PEX-C, an azo cross-linked polyethylene, an azo cross-linked high density polyethylene, PEX-D, a bendable PEX, an expandable PEX, a bendable plastic, an expandable plastic, a shape memory plastic, a memory plastic, a high temperature plastic, a freeze resistant plastic, a chlorine resistant plastic, a pressure-surge dissipation plastic, a plastic suitable for transmitting pressurized liquids or other fluids, a corrosion resistant plastic, a plastic suitable for transport of potable water and any combination of the foregoing.

14. The method of claim 8, wherein the flexible plastic of both the outlet tube and the stem is each selected from the group consisting of a cross-linked polyethylene (PEX), a cross-linked high density polyethylene (HDPE), a cross-linked medium density polyethylene (MDPE), a peroxide cross-linked polyethylene, a peroxide cross-linked high density polyethylene, PEX-A, a silane cross-linked polyethylene, a silane cross-linked high density polyethylene, PEX-B, an electron beam cross-linked polyethylene, an electron beam cross-linked high density polyethylene, PEX-C, an azo cross-linked polyethylene, an azo cross-linked high density polyethylene, PEX-D, a bendable PEX, an expandable PEX, a bendable plastic, an expandable plastic, a shape memory plastic, a memory plastic, a high temperature plastic, a freeze resistant plastic, a chlorine resistant plastic, a pressure-surge dissipation plastic, a plastic suitable for transmitting pressurized liquids or other fluids, a corrosion resistant plastic, a plastic suitable for transport of potable water and any combination of the foregoing.

* * * * *